No. 647,742. Patented Apr. 17, 1900.
C. S. BREWSTER & G. RAFLOVICH.
VALVE FOR PNEUMATIC TIRES.
(Application filed Jan. 7, 1899.)
(No Model.)
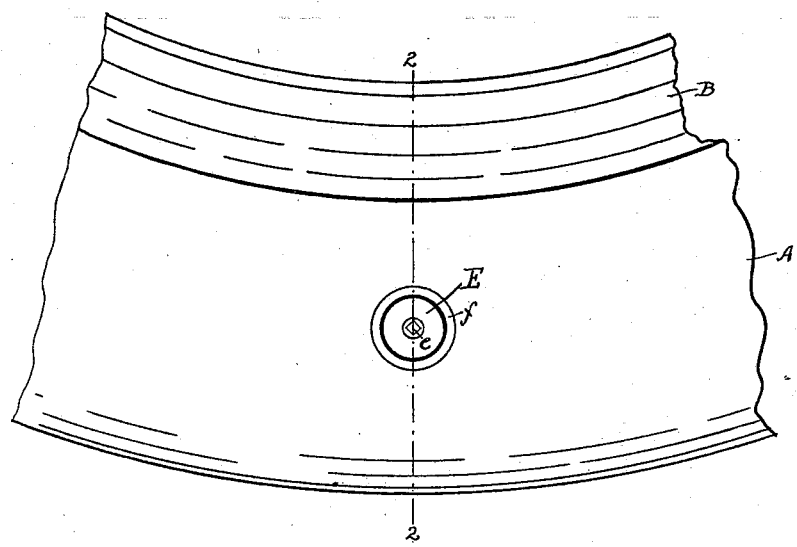
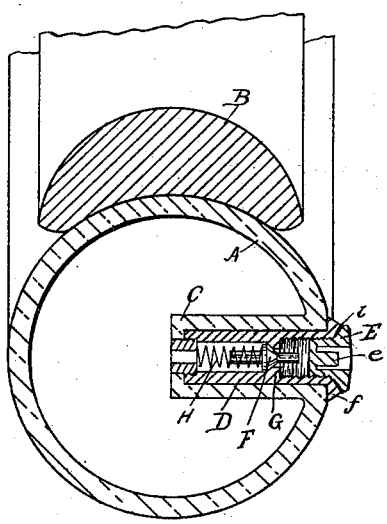

UNITED STATES PATENT OFFICE.

CLARENCE S. BREWSTER AND GUSTAF RAFLOVICH, OF BOSTON, MASSACHUSETTS.

VALVE FOR PNEUMATIC TIRES.

SPECIFICATION forming part of Letters Patent No. 647,742, dated April 17, 1900.

Application filed January 7, 1899. Serial No. 701,533. (No model.)

*To all whom it may concern:*

Be it known that we, CLARENCE S. BREWSTER and GUSTAF RAFLOVICH, residing at Boston, in the county of Suffolk, State of Massachusetts, have invented certain new and useful Improvements in Valves for Pneumatic Tires, of which the following is a description, reference being had to the accompanying drawings, and to the letters of reference marked thereon.

Our invention relates to improvements in valves for pneumatic tires particularly adapted for use upon bicycles and the like, our object being to produce a structure which is simple and cheap, which provides the valve-stem inside the tire and free from the rim, and which prevents undue wear upon the tire by the cap.

To these ends and also to improve generally upon devices of the nature indicated our invention consists in the various matters hereinafter described and claimed.

In the accompanying drawings, Figure 1 is a side elevation of a portion of a wheel rim and tire, the latter being provided with our improved valve; and Fig. 2 is a transverse sectional elevation on the line 2 2 of Fig. 1.

Referring now more particularly to the drawings, A represents a pneumatic tire secured in any suitable manner to a wheel-rim B. At one side of the tire, about midway between the tread and the rim, this tire is provided in its wall with an opening, about which is an inwardly-extending nipple C, here shown as integral with the tire, although said nipple can manifestly be attached in any desired manner. This nipple forms a chamber to receive a metallic valve-casing D and is provided in its inner wall with an opening to permit passage of air into the tire. Intermediate its ends the valve-casing has a diaphragm G, in which is formed the valve-port adapted to be normally closed by the valve F, said valve being yieldingly held in closed position by means of the spiral spring H, intermediate the inner wall of the nipple and the said valve. A flange $f$ extends from the outer end of the valve-casing and lies upon the tire about the opening therethrough, and the outer end of the said casing—*i. e.*, the portion to the outer side of the diaphragm G—is internally threaded to receive the reduced threaded portion of the cap E. Preferably this cap has a recess extending inwardly from its outer face, and in this recess is a squared pin $e$, adapted to receive a watch-key or the like for the purpose of screwing the cap into or out of position. A washer $i$ is preferably interposed between the cap E and the flange $f$.

It will be apparent that in the present structure the valve-stem is not exposed to blows and consequent danger of breaking, nor can the stem be cut by reason of "creeping" of the tire on the rim. The parts are simple and compactly arranged, and the cap E fitting as it does against the flange $f$ rotation of the cap is not against the tire itself, and the removal or replacing of the cap consequently does not wear the thin rubber of the tire.

We claim that the result of the invention of this combination is a simple and compact tire, constructed with particular reference to security against both leakage of air and damage to the cot. This we claim renders the tire proof against much of the damage that occurs to pneumatic tires in common use, such as having the cot strained and weakened or torn from the tire by the creeping of the tire on the rim of the wheel or having the cot strained and weakened when attaching or using an air-pump to inflate the tire or when attaching the valve-cap to the valve.

Having fully described our invention, what we claim is—

The combination with a pneumatic tire having an opening through the wall thereof, of an inwardly-extending nipple secured to said tire about said opening, said nipple having an opening through the inner end wall thereof, a metallic valve-casing within said nipple and having a valve-port therein, a valve for said port, the outer end of said valve-casing being internally threaded, a flange upon the outer end of said valve-casing and lying upon the tire about the said opening therethrough, and a cap provided with a reduced threaded portion, adapted to engage the said internal threads of the valve-casing, whereby the said cap when in position lies against the flange upon the valve-casing; substantially as described.

The foregoing specification of our improvement in pneumatic tires signed by us this 16th day of August, 1898.

CLARENCE S. BREWSTER.
   GUSTAF RAFLOVICH.

Witnesses:
 STEPHEN F. KEYES,
 THEODORE VON RASENNINGE.